(12) United States Patent
Johnson, Jr.

(10) Patent No.: US 8,025,437 B2
(45) Date of Patent: Sep. 27, 2011

(54) TEMPERATURE MONITORING IN UNINTERRUPTIBLE POWER SUPPLY SYSTEMS USING SYNTHETIC LOADING

(75) Inventor: Robert W. Johnson, Jr., Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 712 days.

(21) Appl. No.: 12/169,112

(22) Filed: Jul. 8, 2008

(65) Prior Publication Data

US 2010/0008397 A1    Jan. 14, 2010

(51) Int. Cl.
*G01K 13/00*    (2006.01)
(52) U.S. Cl. ........................................ 374/152; 327/512
(58) Field of Classification Search ............... 374/1, 141, 374/152, 163; 327/512
See application file for complete search history.

(56) References Cited

U.S. PATENT DOCUMENTS

| | | | | |
|---|---|---|---|---|
| 4,175,418 A * | 11/1979 | Steffen et al. | | 374/112 |
| 5,796,278 A * | 8/1998 | Osborn et al. | | 327/108 |
| 6,507,227 B2 * | 1/2003 | Genova et al. | | 327/109 |
| 6,998,899 B2 * | 2/2006 | Nadd et al. | | 327/513 |
| 7,145,322 B2 | 12/2006 | Solveson et al. | | |
| 7,253,602 B2 | 8/2007 | Shvach et al. | | |
| 7,336,055 B2 * | 2/2008 | Ishishita | | 374/E15.001 |
| 7,619,486 B1 * | 11/2009 | Lesea | | 374/170 |
| 7,653,510 B2 * | 1/2010 | Hirohata et al. | | 374/E7.042 |
| 7,831,873 B1 * | 11/2010 | Trimberger et al. | | 374/170 |
| 2005/0286274 A1 | 12/2005 | Pfitzer et al. | | |
| 2006/0121873 A1 * | 6/2006 | Ammar | | 455/326 |
| 2006/0221527 A1 * | 10/2006 | Jacobson | | 361/100 |
| 2009/0195294 A1 * | 8/2009 | McCarthy et al. | | 327/513 |
| 2010/0259242 A1 * | 10/2010 | Gale et al. | | 374/163 |
| 2011/0013670 A1 * | 1/2011 | Tustaniwskyj et al. | | 374/183 |

* cited by examiner

*Primary Examiner* — Brad Bennett
(74) *Attorney, Agent, or Firm* — Myers Bigel Sibley & Sajovec, P.A.

(57) ABSTRACT

An uninterruptible power supply (UPS) is configured to be coupled to a power source at an input node and to a load at an output node. The UPS is synthetically loaded (e.g., to a maximum rated load) by transferring current from the output node to the input node. Concurrent with synthetically loading the UPS, a temperature of an electrical conductor of the UPS is monitored. The monitoring of the temperature of the electrical conductor may include receiving a temperature sensor signal representative of the temperature of the electrical conductor from a temperature sensor (e.g., a self-powered wireless temperature sensor) mounted on the electrical conductor. The invention may be embodied as methods, apparatus and computer-readable media.

25 Claims, 4 Drawing Sheets

TEMPERATURE MONITORING IN UNINTERRUPTIBLE POWER SUPPLY SYSTEMS USING SYNTHETIC LOADING

BACKGROUND OF THE INVENTION

The invention relates to power supply systems, methods and computer program products for operation thereof and, more particularly, to uninterruptible power supply (UPS) systems, methods and computer program products for operation thereof.

A typical UPS includes power conductors (e.g., bus bars) that are used to conduct relatively high currents. For example, bus bars may be used in a high-capacity UPS for AC input and output busses that connect to AC sources and loads, respectively, as well as for intermediate DC busses that connect rectifier and inverter components of the UPS.

As a preventive maintenance measure, such light-current conductors may be periodically monitored to detect for "hot spots" or other thermal characteristics that may be associated with certain failure modes. Typically, such thermal monitoring may involve a technician removing protective panels or other coverings of the UPS and measuring conductor temperature using a handheld infrared temperature detector.

There may be several shortcomings to such an approach. Removal of protective covers and similar assemblies may expose maintenance personnel to increased risk of electrical shock or other injuries. In addition, removal of such covers may disrupt normal airflow, such that the temperature readings obtained while the covers are off may not be an accurate representation of normal operating conditions. Moreover, the manual nature of the testing may make it difficult to obtain data sufficient to identify trends. The testing also may not provide consistent and meaningful data, as the UPS may be loaded at non-uniform levels over a series of measurements and may not reflect, for example, thermal characteristics at full load.

U.S. Pat. No. 7,145,322 to Solveson et al. and U.S. Pat. No. 7,253,602 to Shvach et al. describe self-powered wireless temperature sensing devices that are configured to be attached to power bus bars in circuit breakers, motor controllers and other devices that include conductors that carry current. Such devices may be used to measure conductor temperature and transmit the temperature measurements over a wireless data link.

SUMMARY OF THE INVENTION

Some embodiments of the present invention provide methods of monitoring an uninterruptible power supply (UPS) that is configured to be coupled to a power source at an input node and to a load at an output node. The UPS is synthetically loaded (e.g., to a maximum rated load) by transferring current from the output node to the input node. Concurrent with synthetically loading the UPS, a temperature of an electrical conductor of the UPS is monitored. The monitoring of the temperature of the electrical conductor may include receiving a temperature sensor signal representative of the temperature of the electrical conductor from a temperature sensor mounted on the electrical conductor. For example, the temperature sensor may include a wireless temperature sensor mounted on the electrical conductor.

In some embodiments, the synthetic loading of the UPS may include transferring current from the output of the UPS to the input of the UPS via a bypass circuit of the UPS. In further embodiments, synthetic loading of the UPS comprises transferring current from the output of the first UPS to the input of the first UPS via a second UPS connected in parallel with the UPS. According to additional embodiments, the UPS is periodically synthetically loaded during each of a series of discrete time intervals, and a series of measurements of the temperature of the electrical conductor is generated, respective ones of the series of measurements corresponding to respective ones of the time intervals. A trend or other analysis may be generated responsive to the series of measurements.

Further embodiments of the present invention provide an apparatus for monitoring a UPS that is coupled to a power source at an input node and to a load at an output node. The apparatus includes a receiver circuit configured to receive a temperature sensor signal representative of a temperature of an electrical conductor of the UPS and a controller circuit operatively associated with a loading circuit and the receiver circuit and configured to cause the loading circuit to synthetically load the UPS by transferring current from the output node to the input node and to monitor a temperature of the electrical conductor of the UPS responsive to the received temperature sensor signal concurrent with the synthetic loading.

Still further embodiments provide an apparatus including a UPS configured to be coupled to a power source at an input node and to be coupled to a load at an output node, the UPS comprising a power converter circuit configured to transfer power from the input node to the output node and bypass circuit configured to directly couple the input node and the output node to bypass the power converter circuit, a temperature sensor configured to generate a temperature sensor signal representative of an electrical conductor of the UPS, a receiver circuit configured to receive the temperature sensor signal and a controller circuit operatively associated with the UPS and the receiver circuit and configured to cause the power converter circuit and the bypass circuit to synthetically load the UPS circuit by transferring current from the output node to the input node via the bypass circuit and to monitor a temperature of the electrical conductor to the received temperature sensor signal concurrent with the synthetic loading.

DETAILED DESCRIPTION OF EXEMPLARY EMBODIMENTS

Figure 1:
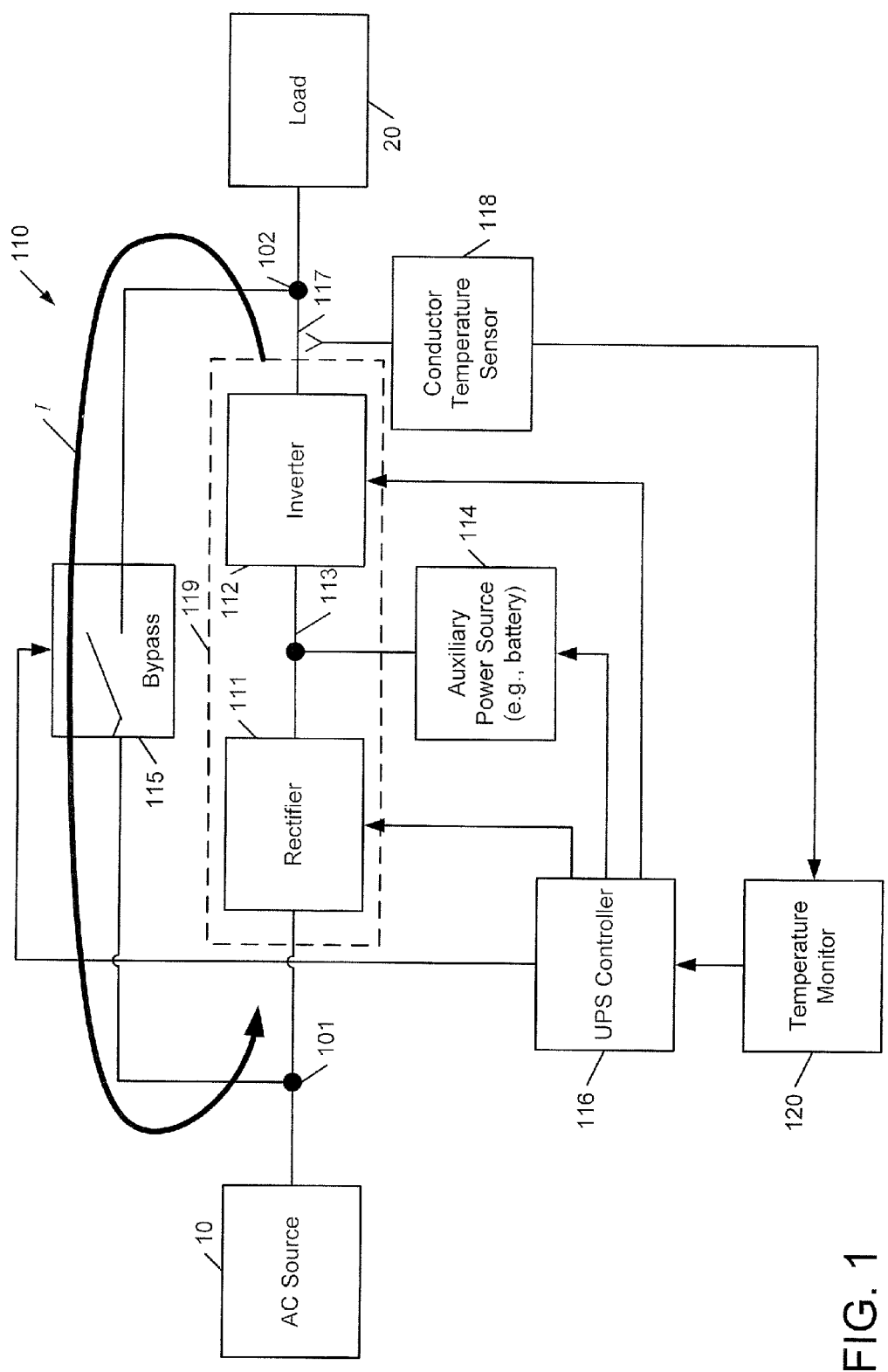
FIG. 1 is a schematic diagram illustrating operation of a UPS that is synthetically loaded in conjunction with conductor temperature monitoring according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the invention may be embodied as systems, methods and articles of manufacture in the form of computer-readable storage media. Some embodiments of the invention may include hardware and software components. Some embodiments of the invention include circuitry configured to provide functions described herein. It will be appreciated that such circuitry may include analog circuits, digital circuits, and combinations of analog and digital circuits. Some embodiments of the invention may include a computer-readable storage medium products comprising computer program code embodied therein. The computer-readable storage medium may include, for example, a semiconductor memory device (e.g., static, dynamic or flash memory) or a magnetic or optical storage medium (e.g., tape, compact disk, etc.).

Embodiments of the invention are described below with reference to block diagrams and/or operational illustrations of systems and methods according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some implementations, the functions/acts noted in the figures may occur out of the order noted in the block diagrams and/or operational illustrations. For example, two operations shown as occurring in succession may, in fact, be executed substantially concurrently. Operations may sometimes be executed in the reverse order, depending upon the functionality/acts involved.

Some embodiments of the present invention arise from a realization that accurate and safe monitoring of thermal characteristics of a UPS may be achieved by using temperature sensors in conjunction with synthetic loading techniques that allow accurate thermal information to be obtained. As used herein, "synthetic loading" of a UPS refers to use of bypass feedback and similar techniques to achieve loading of the UPS that mimics loading with an external load without substantially adding to energy expended in an external load. Such techniques may involve, for example, returning power passing through the UPS to a power source coupled to an input of the UPS.

FIG. 1 illustrates apparatus and operations for monitoring of conductor temperatures in a UPS 110 according to some embodiments of the present invention. The UPS 110 may include a power converter circuit 119 including a series combination of a rectifier 111 and an inverter 112 coupled by a DC bus 113. The rectifier 111 is configured to be coupled to an AC power source 10 at an input node 101, and produces a DC voltage on the DC bus 113 from the AC power source 10. The inverter 112, which is configured to be coupled to a load 20, generates an AC output voltage at a second node 102. The UPS 110 further includes an auxiliary power source 114 that is configured to provide backup power to the DC bus 113 in the event of the loss of the primary AC source 10. The auxiliary power source 114 may include, for example, a battery or other energy storage device. The UPS 110 also includes a bypass circuit 115, which is configured to provide a direct connection between the first and second nodes 101, 102, such that the power converter circuit is bypassed.

The UPS 110 further includes a UPS controller circuit 116 that controls the rectifier 111, inverter 112, auxiliary power source 114 and the bypass circuit 115. For example, the UPS controller circuit 116 may control various parameters of these circuits such that, for example, the inverter 112 produces an AC waveform with a prescribed amplitude and phase and such that the rectifier 111 provides a specified DC voltage on the DC bus 113 to support the load 20.

The UPS controller circuit 116 may also be configured to control the rectifier 111, inverter 112 and bypass 115 such that a "synthetic" loading of the UPS 110 by establishing a current flow I from the output node 102 to the input node 101 via the bypass circuit 115. Such a configuration may be used, for example, to establish a "no load/full load" synthetic loading condition wherein a full rated output current at the output node 102 is synthetically established for testing and other purposes without actually delivering this current to an external resistive or other load, as described, for example, in U.S. patent application Ser. No. 10/879,441, published as Patent Application Publication No. 2005/0286274, the disclosure of which is hereby incorporated by reference in its entirety.

A temperature sensor may be provided that is configured to sense a temperature of a conductor of the UPS 110. For example, as shown, a temperature sensor 118 may be provided to sense a temperature of an output conductor 117 connected between the output of the inverter 112 and the output node 102, i.e., the output of the UPS 110. Such a conductor may be, for example, a bus bar, and the temperature sensor 118 may be, for example, a wireless self-powered temperature sensor configured to mount on a bus bar along the lines described in the aforementioned U.S. Pat. No. 7,145,322 to Solveson et al. and U.S. Pat. No. 7,253,602 to Shvach et al., the disclosures of which are hereby incorporated by reference in their entireties. It will be appreciated that the conductor may take a form other than a bus bar, and that other types of temperature sensors may be used, such as wired temperature sensors and/or temperature sensors that use infrared or other temperature sensing techniques. It will be further appreciated that, although a temperature sensor 118 for an output conductor 117 is illustrated, temperatures of other conductors of the UPS 110, such as input conductors connected to the input node 101, conductors of the DC bus 113 and/or conductors internal to components of the UPS 110, such as the rectifier 111 and inverter 112, may be similarly sensed.

According to some embodiments of the present invention, a temperature monitor circuit 120 is configured to cause the UPS 110 to provide synthetic loading as described above concurrent with monitoring conductor temperature using the temperature sensor 118, such that conductor temperatures may be measured under predetermined loading conditions. Such an approach can support detection of problems in the UPS 110, such as "hot spots" that may cause safety or failure issues, and/or may be used for trend analysis or other analytical processes.

It will be appreciated that components of the UPS 110, such as the rectifier 111, inverter 112, auxiliary power source 114, bypass circuit 115 and UPS controller circuit 116 may, in general, be implemented using any of a number of different analog and digital circuits. For example, the rectifier 111 and inverter 112 may be implemented using power semiconductor switching devices, such as IGBTs. Similar devices may be used in the auxiliary power source 114, for example, in switching and/or converter circuits that couple a battery or other energy storage device to the DC bus 113. The UPS controller 116 may be implemented, for example, using a microprocessor, microcontroller or the other computing device and/or by analog circuitry configured to provide analogous control functions. The bypass circuit 115 may employ, for example, solid state and/or mechanical switching devices. Similarly, the temperature monitor circuit 120 may be implemented using analog and/or digital circuitry. All or parts of the temperature monitor circuit 120 may be integrated with the UPS 110, or the temperature monitor circuit 120 may be implemented in a separate assembly, such as a control or monitoring device.

Monitoring of conductor temperature in a UPS can be done manually and/or automatically. Monitoring may be discrete and/or periodic, and the information generated may be provided to a user in a variety of different forms, e.g., in graphs, tables and the like, and can also be used to trigger, for example, alarms or maintenance alerts.

Figure 2:
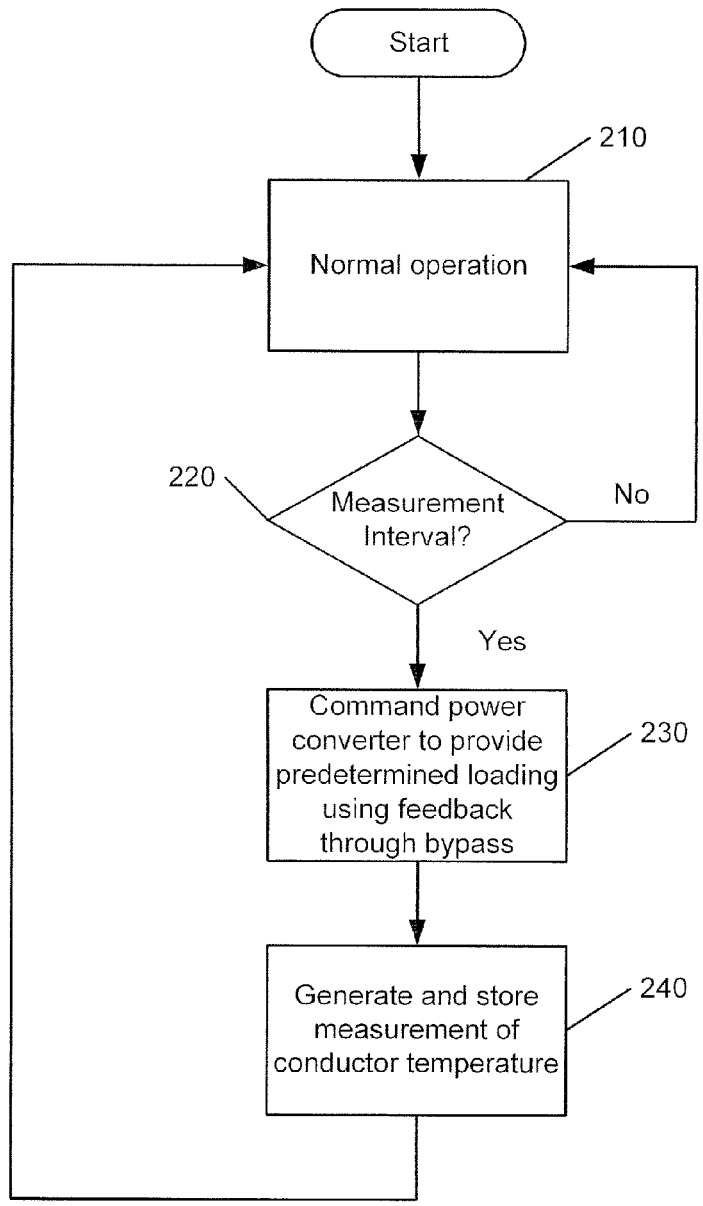
FIG. 2 is a flowchart illustrating operations for periodically synthetically loading a UPS and generating associated temperature measurements according to further embodiments of the present invention.

For example, referring to FIG. 2, while operating in a normal mode (block 210), the temperature monitor circuit 120 may detect the beginning of a temperature measurement interval (block 220). During the temperature measurement interval, the temperature monitor circuit 120 may command the UPS controller circuit 116 to synthetically load the UPS 110 by passing current from the output node 102 to the input node 101 via the bypass circuit 115, and controlling the rectifier 111 and inverter 112 accordingly (block 230). For example, the temperature monitoring circuit 120 may cause the UPS 110 to be synthetically loaded to a maximum rated output. While the UPS 110 is synthetically loaded, the temperature monitor circuit 120 may generate and store a measurement of conductor temperature responsive to a signal received from the temperature sensor 118 (block 240). After termination of the temperature measurement interval, the UPS 110 may return to normal operation (block 210) until the beginning of a new measurement interval.

In this manner, the temperature monitor circuit 120 may generate a series of temperature measurements, which may be used for a variety of monitoring and analytical purposes. For example, the temperature monitor circuit 120 may provide an indication to a user, such as a report and/or alarm, responsive to the temperature measurements. The temperature measurements may also be used, for example, as input to a computer-implemented trend analysis process or other analytical process.

Figure 3:
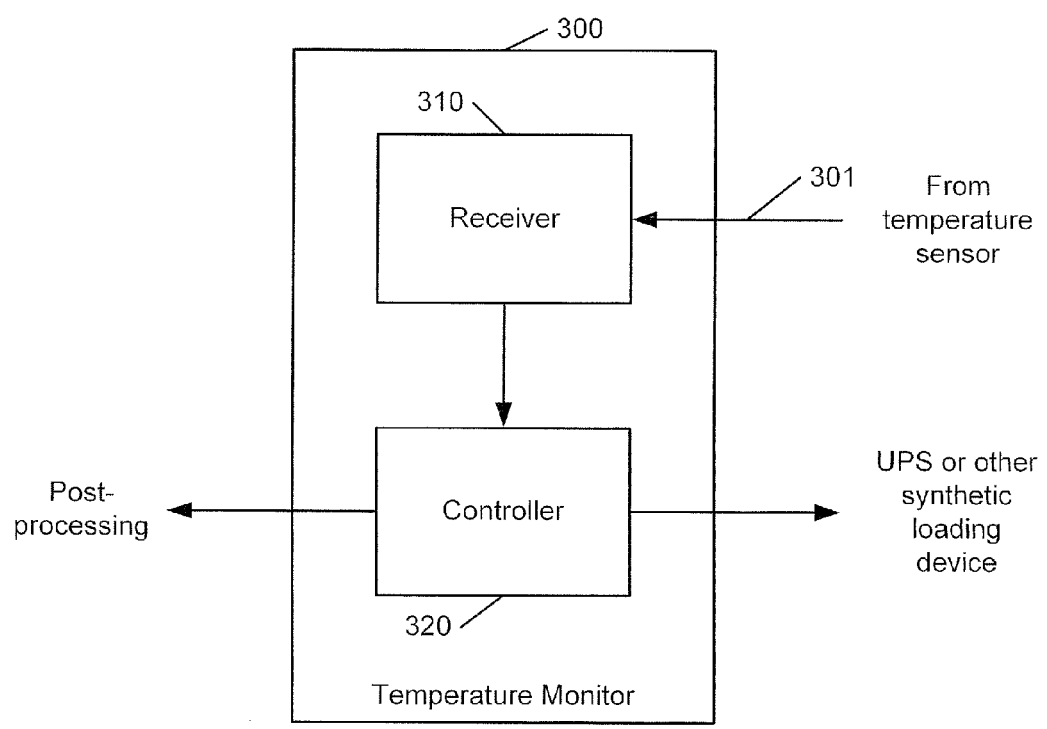
FIG. 3 is a schematic diagram illustrating a temperature monitor circuit according to some embodiments of the present invention.

FIG. 3 illustrates an example of a temperature monitor circuit 300 according to further embodiments of the present invention. The temperature monitor circuit 300 includes a receiver circuit 310 configured to receive a temperature sensor signal 301 that is representative of a conductor temperature in a UPS. The receiver circuit 310 may, in general, be a wireless (e.g., radio or optical) or wireline receiver circuit. The receiver circuit 310 transmits temperature measurement information to a controller circuit 320, which controls a UPS or other device that provides synthetic loading, Responsive to temperature signal information received by the receiver circuit 310, the controller circuit 320 also provides temperature measurement data for further post-processing, such as trend analysis and/or alarm generation.

Figure 4:
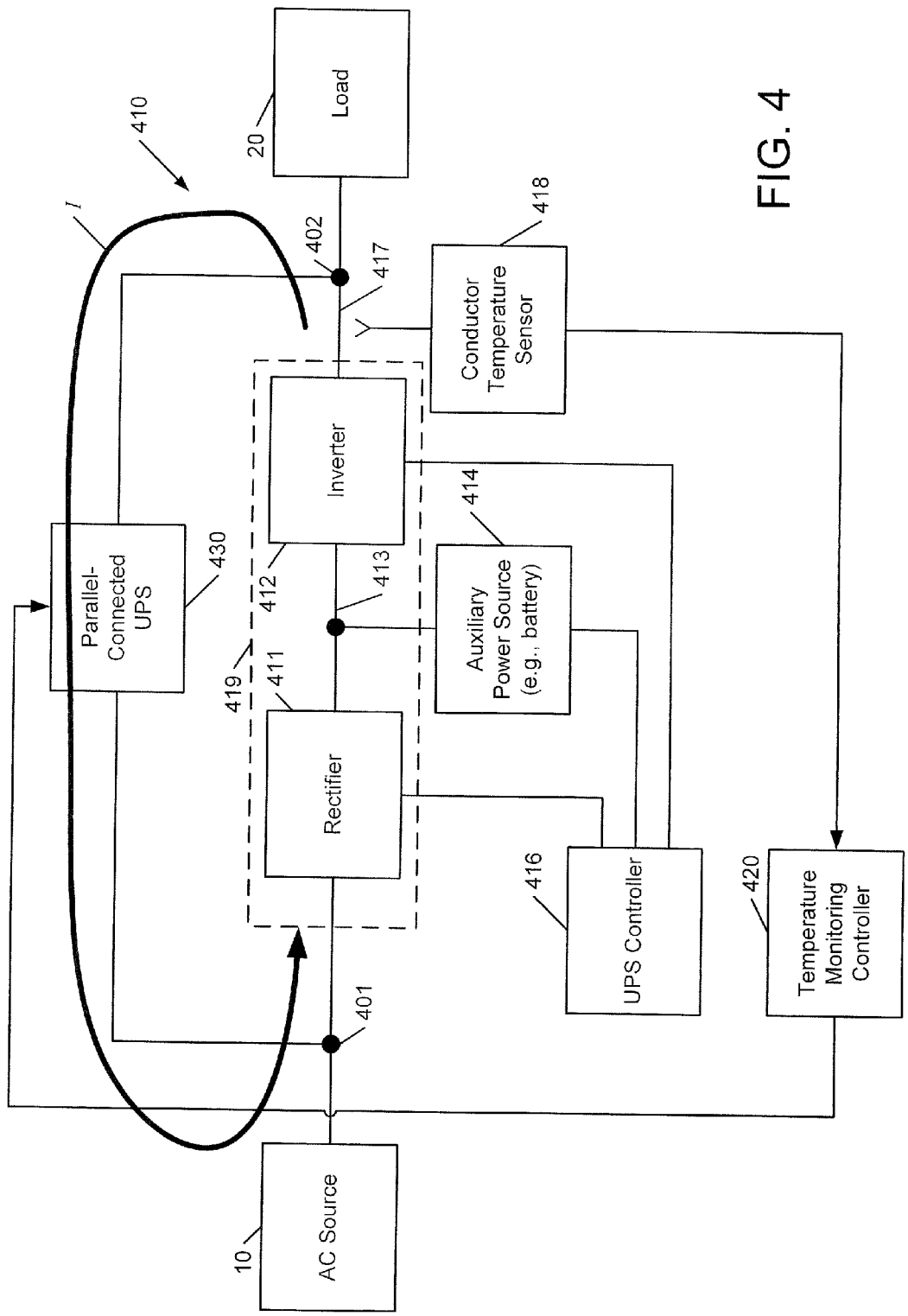
FIG. 4 is a schematic diagram illustrating operation of a UPS that is synthetically loaded by another UPS in conjunction with conductor temperature monitoring according to further embodiments of the present invention.

In some embodiments, synthetic loading of a UPS may be accomplished using techniques other than the bypass-employing technique described above. For example, FIG. 4 illustrates an alternative implementation in which synthetic loading of a first UPS 410 is provided by a second UPS 430 under control of a temperature monitor circuit 420. The first UPS 410 includes a power converter circuit 419 including a rectifier 411 configured to be connected to an AC source 10 at an input node. The power converter 419 further includes an inverter 412 coupled to the rectifier by a DC bus 413. An auxiliary power source 414 is coupled to the DC bus 413. A UPS controller circuit 416 controls the rectifier 411, inverter 412 and auxiliary power source 414 to provide uninterruptible power to a load 20 connected to the first UPS 410 at an output node 402. The first UPS 410 may include additional components, such as a bypass circuit (not shown) configured to provide a bypass path around the power converter circuit 419. The second UPS 430 is coupled in parallel with the first UPS 410 between the input node 401 and the output node 402.

A temperature monitor circuit 420 is coupled to the second UPS 430 and is configured to receive a temperature signal from a temperature sensor 418 configured to sense a temperature of an output conductor 417 of the first UPS 410. As shown, the monitored output conductor 417 is an output conductor of the UPS 410, but it will be appreciated that the temperatures of other conductors of the UPS 410 may be similarly monitored.

The temperature monitor circuit 420 may be configured to cause the second UPS 430 to synthetically load the first UPS 410. Concurrent with the synthetic loading, the temperature monitor circuit 420 may generate and store measurements of conductor temperature responsive to the temperature sensor 418. For example, the second UPS 430 may include control circuitry configured to control operation of a rectifier, inverter and/or bypass circuit of the second UPS 430 such that the second UPS 430 supports a current from the output node 402 to the input node 401 via the second UPS 430 to place a synthetic load on the first UPS 410, as described, for example, in the aforementioned U.S. patent application Ser. No. 10/879,441. Concurrent with this synthetic loading, the temperature monitor circuit 420 may generate and store conductor temperature measurements, which may be used for control and analytical operations along the lines discussed above with reference to FIGS. 1 and 2.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method of monitoring an uninterruptible power supply (UPS) that is configured to be coupled to a power source at an input node and to a load at an output node, the method comprising:
   synthetically loading the UPS by transferring current from the output node to the input node; and
   concurrent with synthetically loading the UPS, monitoring a temperature of an electrical conductor of the UPS.

2. The method of claim 1, wherein monitoring a temperature of an electrical conductor of the UPS comprises receiving a temperature sensor signal representative of the temperature of the electrical conductor from a temperature sensor mounted on the electrical conductor.

3. The method of claim 2, wherein the temperature sensor comprises a wireless temperature sensor mounted on the electrical conductor.

4. The method of claim 1, wherein synthetically loading the UPS comprises loading the UPS to a maximum rated output of the UPS.

5. The method of claim 1, wherein synthetically loading the UPS comprises transferring current from the output of the UPS to the input of the UPS via a bypass circuit of the UPS.

6. The method of claim 1, wherein the UPS comprises a first UPS and wherein synthetically loading the UPS comprises transferring current from the output of the first UPS to the input of the first UPS via a second UPS connected in parallel with the first UPS.

7. The method of claim 1:
   wherein synthetically loading the UPS comprises periodically synthetically loading the UPS during each of a series of discrete time intervals; and
   wherein monitoring a temperature of an electrical conductor in the UPS comprises generating a series of measurements of the temperature of the electrical conductor, respective one of the series of measurements corresponding to respective ones of the time intervals.

8. The method of claim 7, further comprising generating a trend analysis responsive to the series of measurements.

9. The method of claim 7, further comprising providing an indication to a user responsive to the series of measurements.

10. An apparatus for monitoring a UPS that is coupled to a power source at an input node and to a load at an output node, the apparatus comprising:
    a receiver circuit configured to receive a temperature sensor signal representative of a temperature of an electrical conductor of the UPS; and
    a controller circuit operatively associated with a loading circuit and the receiver circuit and configured to cause the loading circuit to synthetically load the UPS by transferring current from the output node to the input node and to monitor a temperature of the electrical conductor of the UPS responsive to the received temperature sensor signal concurrent with the synthetic loading.

11. The apparatus of claim 10, wherein the receiver circuit is configured to receive the temperature signal from a wireless temperature sensor mounted on the electrical conductor.

12. The apparatus of claim 10, wherein the loading circuit comprises a bypass circuit of the UPS and wherein the controller circuit is configured to cause the UPS to synthetically load the UPS by transferring current from the output node to the input node via the bypass circuit.

13. The apparatus of claim 10, wherein the UPS comprises a first UPS, wherein the loading circuit comprises a second UPS, and wherein the controller circuit is configured to cause the second UPS to synthetically load the first UPS by transferring current from the output node to the input node via the second UPS.

14. The apparatus of claim 10, wherein the controller circuit is configured to cause the loading circuit to synthetically load the UPS during each of a series of discrete time intervals and wherein the controller is further configured to generate a series of measurements of the temperature of the electrical conductor, respective ones of the series of measurements corresponding to respective ones of the time intervals.

15. The apparatus of claim 14, wherein the controller circuit is further configured to generate a trend analysis responsive to the measurements of the temperature.

16. The apparatus of claim 14, wherein the controller circuit is further configured to provide an indication to a user responsive to the measurements of the temperature.

17. An apparatus, comprising:
    a UPS configured to be coupled to a power source at an input node and to be coupled to a load at an output node, the UPS comprising a power converter circuit configured to transfer power from the input node to the output node and bypass circuit configured to directly couple the input node and the output node to bypass the power converter circuit;
    a temperature sensor configured to generate a temperature sensor signal representative of an electrical conductor of the UPS;
    a receiver circuit configured to receive the temperature sensor signal; and
    a controller circuit operatively associated with the UPS and the receiver circuit and configured to cause the power converter circuit and the bypass circuit to synthetically load the UPS circuit by transferring current from the output node to the input node via the bypass circuit and to monitor a temperature of the electrical conductor to the received temperature sensor signal concurrent with the synthetic loading.

18. The apparatus of claim 17, wherein temperature sensor is mounted on the electrical conductor.

19. The apparatus of claim 18, wherein the temperature sensor comprises a wireless temperature sensor mounted on the electrical conductor.

20. The apparatus of claim 17, wherein the controller circuit is configured to cause synthetic loading of the UPS to a maximum rated output of the UPS and to monitor the temperature of the electrical conductor during the synthetic loading to the maximum rated output.

21. The apparatus of claim 17, wherein the controller circuit is configured to cause the UPS circuit to synthetically load during each of a series of discrete time intervals and to generate a series of measurements of the temperature of the electrical conductor, respective one of the series of measurements corresponding to respective ones of the time intervals.

22. The apparatus of claim 21, wherein the controller circuit is further configured to generate a trend analysis responsive to the series of measurements.

23. The apparatus of claim 21, wherein the controller circuit is further configured to provide an indication to a user responsive to the series of measurements.

24. A computer-readable storage medium comprising computer program code embodied therein, the computer-readable program code comprising:
    program code configure to cause synthetic loading the UPS by transferring current from the output node to the input node; and program code configured to monitor a temperature of an electrical conductor of the UPS concurrent with the synthetic loading of the UPS.

25. The computer-readable storage medium of claim 24:

wherein the program code configure to cause synthetic loading the UPS by transferring current from the output node to the input node comprises program code configured to cause periodic synthetic loading of the UPS during each of a series of discrete time intervals;

wherein the program code configured to monitor a temperature of an electrical conductor of the UPS concurrent with the synthetic loading of the UPS comprises program code configured to generate a series of measurements of the temperature of the electrical conductor, respective one of the series of measurements corresponding to respective ones of the time intervals; and wherein the computer program code further comprises program code configure to provide an indication of conductor temperature to a user responsive to the series of measurements.

\* \* \* \* \*